Figure 1:
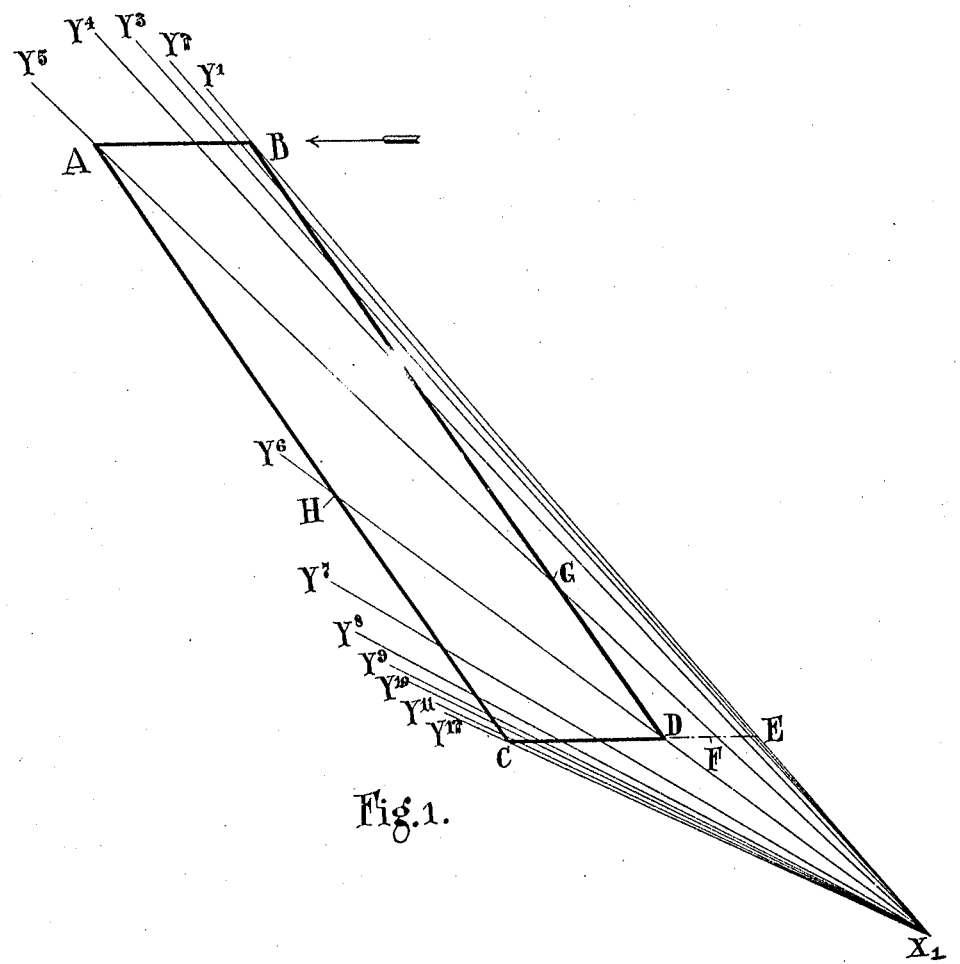

J. W. DUNNE.
AEROPLANE.
APPLICATION FILED APR. 1, 1910.

1,003,721.

Patented Sept. 19, 1911.
9 SHEETS—SHEET 1.

Witnesses:
Olive D. White
Margaret D. Umhau

Inventor:
John William Dunne
By Bonnelycke
Atty.

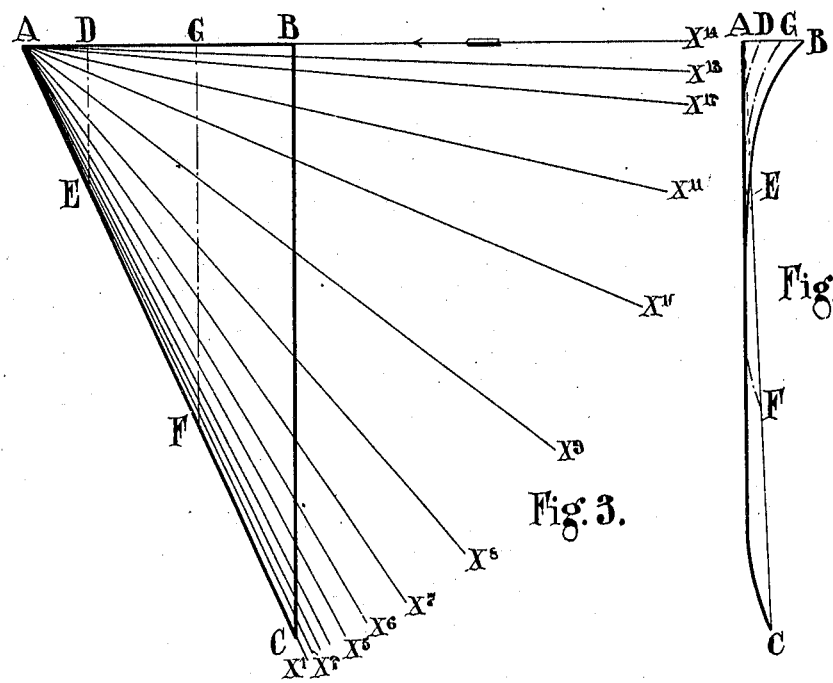
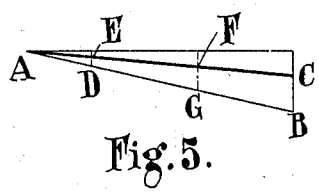

J. W. DUNNE.
AEROPLANE.
APPLICATION FILED APR. 1, 1910.
1,003,721.
Patented Sept. 19, 1911.
9 SHEETS—SHEET 3.
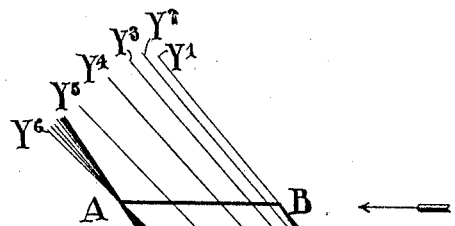
Fig. 6.
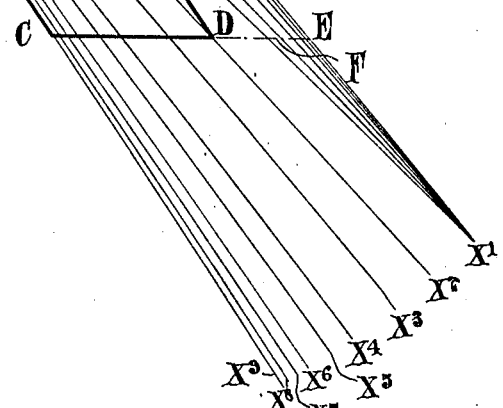
Fig. 7.
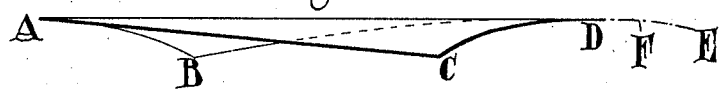
Witnesses:
Olive D. White
Margaret D. Umhau
Inventor:
John William Dunne
By Emil Bönnelycke
Atty

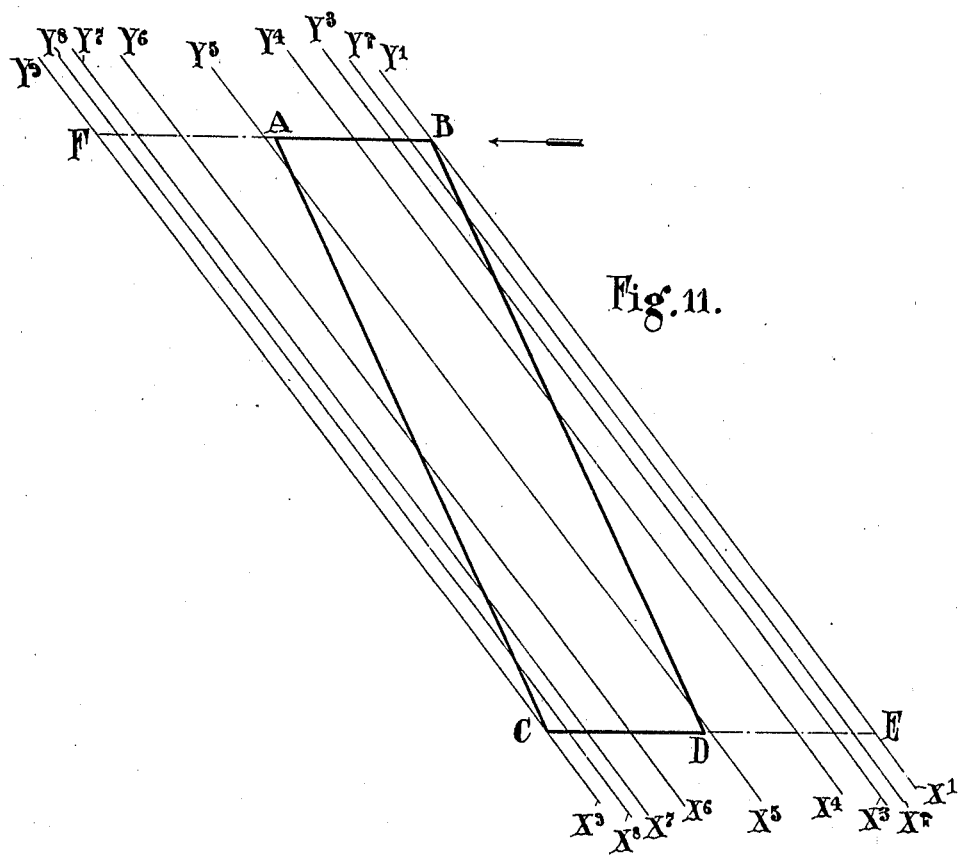
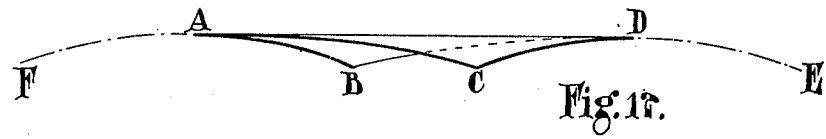

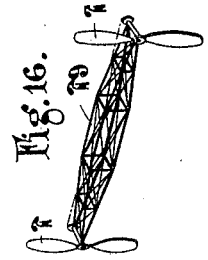
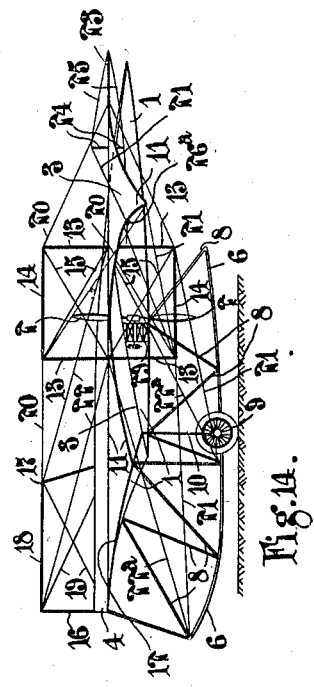
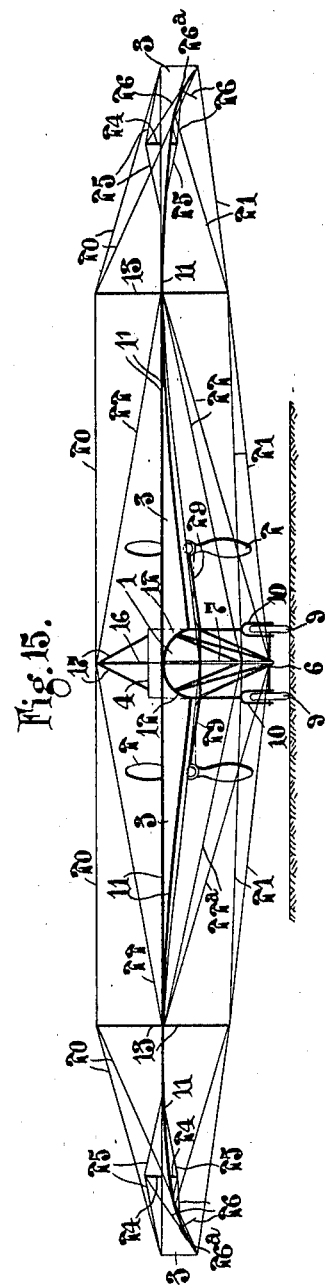

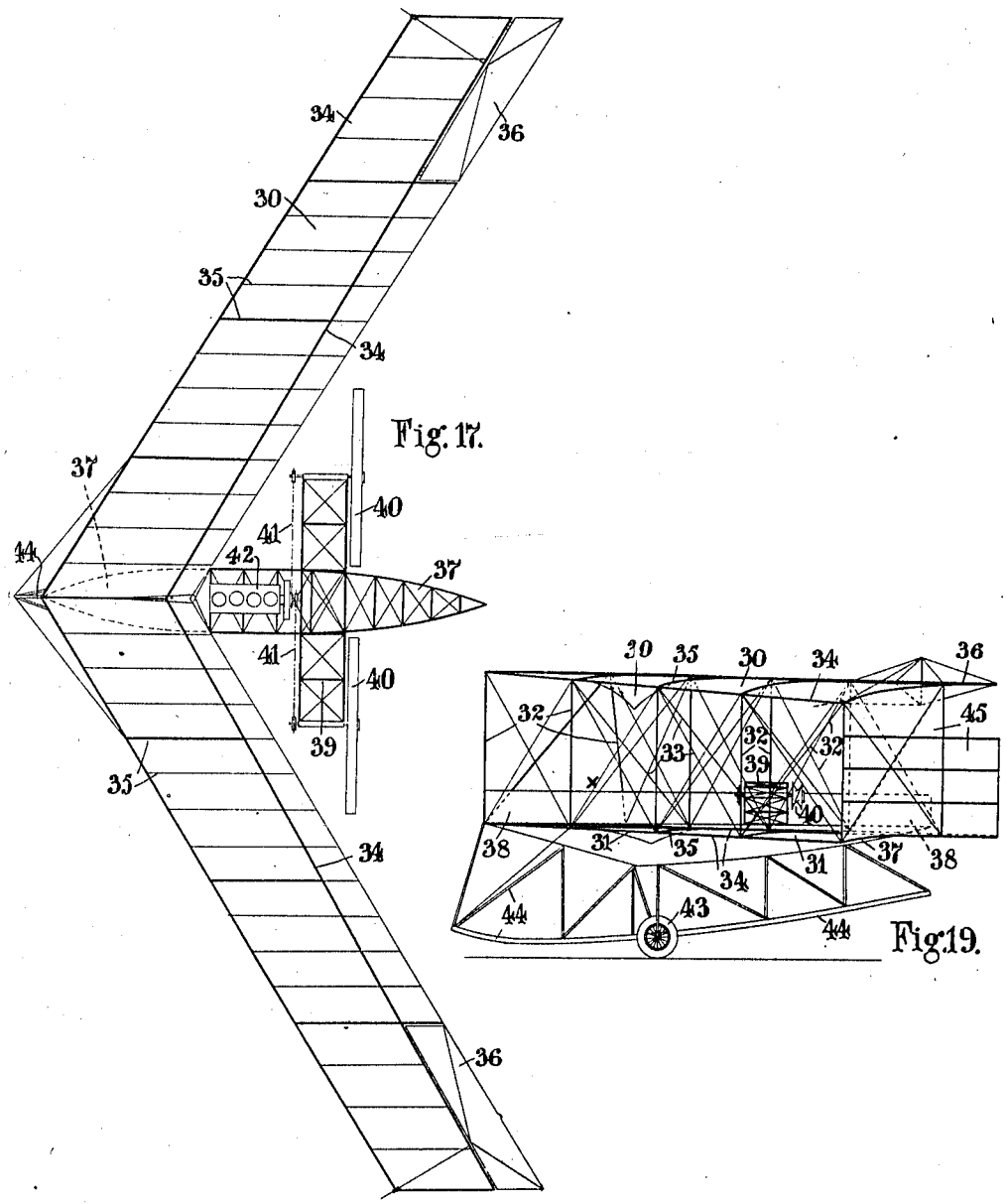

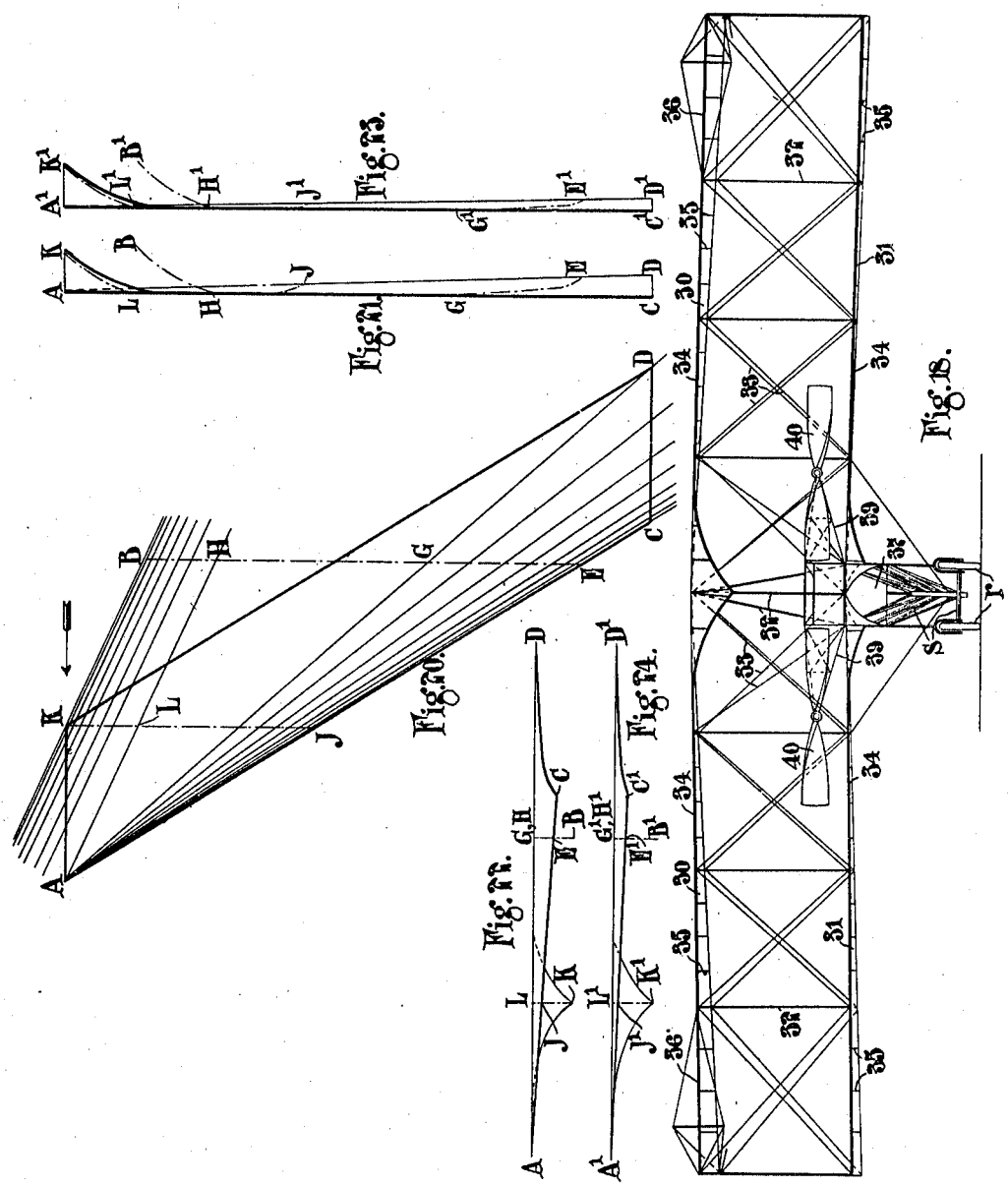

UNITED STATES PATENT OFFICE.

JOHN WILLIAM DUNNE, OF LONDON, ENGLAND, ASSIGNOR TO BLAIR ATHOLL AEROPLANE SYNDICATE LIMITED, OF LONDON, ENGLAND.

AEROPLANE.

1,003,721.      Specification of Letters Patent.      Patented Sept. 19, 1911.

Application filed April 1, 1910. Serial No. 552,833.

*To all whom it may concern:*

Be it known that I, JOHN WILLIAM DUNNE, a subject of the King of Great Britain and Ireland, and residing at 16 Charing Cross, London W. C., England, have invented certain new and useful Improvemnts Relating to Aeroplanes, of which the following is a specification.

The object of the present invention is to obtain a form of aeroplane which by virtue solely of the arrangement and form of its supporting surfaces possesses when properly ballasted automatic stability in still air, and also, without requiring any alteration of its center of gravity or of its surfaces, in very high winds; further, to construct the aeroplane in such a manner that it possesses in calm and in agitated air a large measure of freedom from oscillation, a quality quite distinct from that of stable equilibrium, and also to obtain large pressure reactions when the aeroplane is driven at an angle against the air.

The invention consists in constructing each of the main supporting surfaces as a rearwardly projecting rigid wing, the angle of incidence of which decreases from the center toward the tips and in some cases changes sign and compensating for the decreased lifting power of the tips by shaping the wing so as to compress air between a positively inclined portion of the wing near the center and a negatively inclined portion in the region of the tip.

The invention also consists in constructing each of the main supporting surfaces as a rearwardly projecting wing, the upper face of which may be defined as traced by a straight line traveling on two guide curves one of which may be infinitely small, so arranged that the resulting surface swept out is convex toward its upper side in all sections taken fore and aft and laterally, the angle of incidence gradually decreasing from the center to the ends of the wings and in some cases changing sign, and the lower faces of the wings being preferably concave.

The invention also consists in constructing each of the superposed main supporting surfaces of a biplane, for example, as a projecting wing, the angles of incidence of the uppermost surfaces gradually decreasing toward the tips and in some cases changing sign while the decrease is so arranged that the tips of the uppermost wings are inclined downward and forward in relation to the tips of preferably the lowermost pair.

The invention also consists in the improved constructions of aeroplane hereinafter described.

It will be understood that in the present specification, where not otherwise specified, the surfaces of the wings referred to are the upper surfaces, the lower surfaces being preferably concave, although plane or even convex portions may occur where such are advisable by reason of considerations such as the strength of the structure. It will also be understood that the expression "angle of incidence" in the fore and aft direction means in the case of a plane surface the angle made by the fore and aft section of that surface with the line of flight; in the case of a curved surface the angle made by the line of flight with a straight line drawn from front end to rear end of the curve exposed by a cross section.

In order to obtain large pressure reactions when the aeroplane is driven at an angle against the air the lifting surfaces must be convex on the upper side and preferably concave on the under side. Further, the machine should be supported by either a single pair of main wings, one wing on each side, or by two such systems placed one above the other as the addition of any further surfaces tends to reduce the efficiency of the whole.

In order to maintain fore and aft stability, I have found it advisable that the whole or the outer part of each wing should have its leading edge so sloped backward and outward that the tips of the wings come behind the center of gravity of the apparatus.

I find that in plan the angle of inclination of the wings to the line of flight is preferably between the limits of 40° and 70°.

In order to render the machine free from oscillation, it is advisable that as the wing extends outward the angle of incidence should decrease gradually so that there may be no abrupt alteration of angle at any part of the wing. With a wing so formed alterations of the mean angle of incidence bring into play gradual alterations in the pressures on the wings gently to correct the deviation from normal conditions. It is of the greatest importance that this correction should be gentle at the commencement of an oscillation, and it is equally important that the tendency should persist through wide ranges of variation in the mean angle of incidence and increase as the departure from the normal conditions increases. This latter condition requires that the difference between the angles of incidence of the inner and outer portions of the wing should be considerable, a condition which in turn requires in general a negative angle of incidence at the tips under normal flight conditions.

I have found that twisting the wings or rendering them flexible so that they twist under air pressure, to cause the tips to present the requisite small angle, involves the disadvantage that sections taken fore and aft across the tips of the wings or from the inner portion to the tip give curves more or less concave on their upper sides, thus greatly detracting from the lifting powers of the wing. A twisted wing therefore is unable to give large pressure reaction when driven at an angle against the air. I have found further that when such a twisted wing changes its mean angle of incidence the changes thereby brought about in the pressures on the outer portions which are concave on their upper sides, occur far too abruptly for steadiness, and in very high winds may produce a condition of unstable equilibrium. Also that the similar concavity on the lateral cross section of the wings gives lateral instability in disturbed air. This form of wing therefore is not suitable. In order to obtain the correct form therefore it is necessary to consider. Firstly, how the angle of the fore and aft sections can be made gradually to decrease as the wing is built outward without producing points of inflection in the surfaces; and secondly, how considerable differences in the angles of the inner and outer portions can be maintained without too much loss of pressure under the outer portions and therefore loss of lifting power.

I will now describe certain forms of wing surface by way of example which meet the conditions laid down above and will then describe examples of complete aeroplanes in which one such wing form is embodied.

Figure 2:
Figure 8:
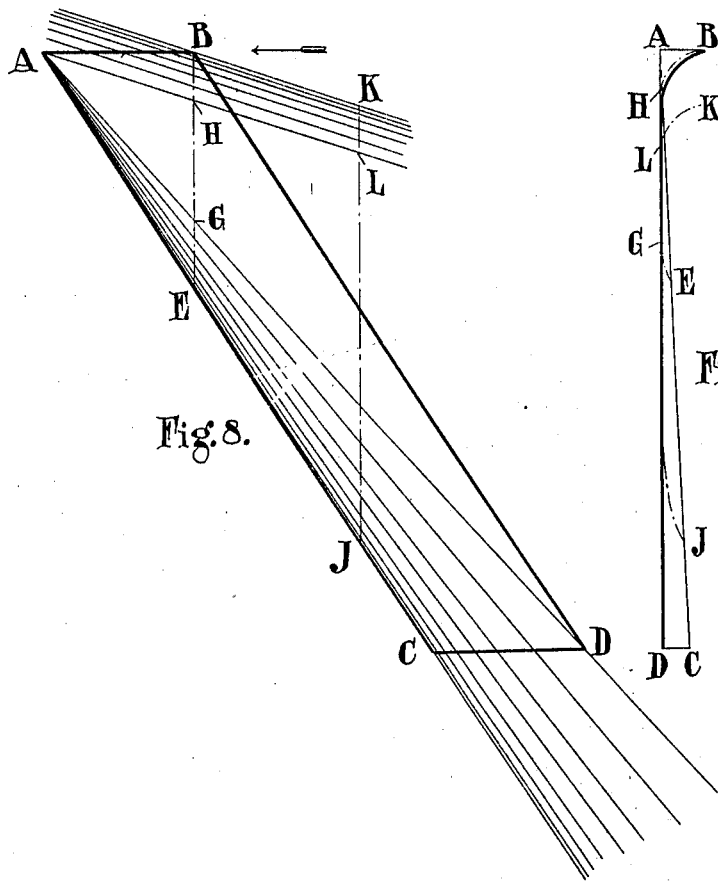
Figure 13:
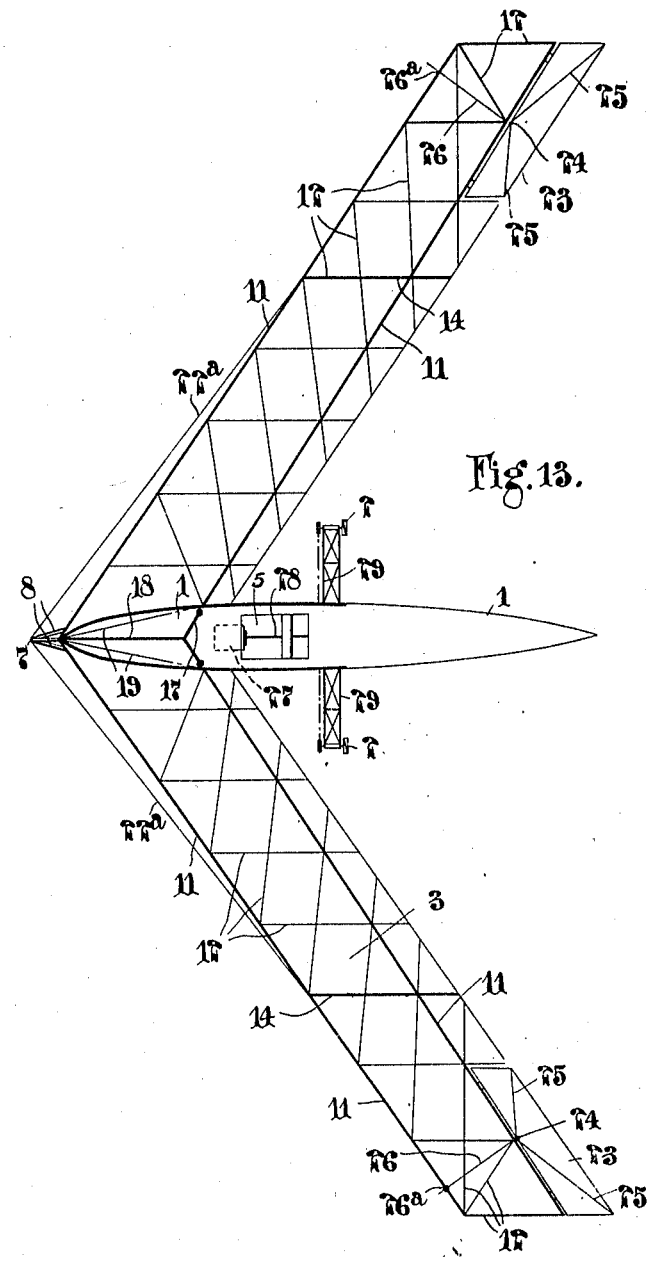

Referring for this purpose to the accompanying drawings which form part of the specification:—Figure 1 shows a plan of a form of wing in which the upper face forms part of a conical surface with rearwardly disposed apex. Fig. 2 being a corresponding side elevation; Fig. 3 shows a plan of another modification in which the upper face of the wing forms part of a conical surface with forwardly disposed apex, Figs. 4 and 5 being corresponding rear view and side elevations; Fig. 6 shows a plan of a modified form of wing in which the upper face is composed of parts of two conical surfaces with reversely disposed apices, Fig. 7 being a corresponding side elevation; Fig. 8 shows a plan of another modification of wing in which the upper face is composed partly of a conical surface with a forwardly disposed apex and partly of a cylindrical surface, Figs. 9 and 10 being corresponding rear and side elevations respectively; while Fig. 11 shows a plan of a modification in which the upper face of the wing forms part of a cylindrical surface, Fig. 12 being a corresponding side elevation. In the above plan views the left hand wing only is shown for simplicity in each case, the right hand wing being understood to be similar and symmetrically situated with regard thereto on the other side of the center line, the position of which is indicated by the arrow; the arrow likewise shows the direction of flight. Moreover, those parts of the wing outline which are hidden are dotted in the figures while such parts of the guide curves as do not coincide with the wing outline are indicated by dot-and-dash lines. Fig. 13 shows a plan of a monoplane in which is embodied the wing form of Fig. 1. Figs. 14 and 15 being corresponding side and front elevations; while Fig. 16 shows a perspective view of the frame supporting the propellers. Fig. 17 shows a plan of a biplane embodying my improvements. Figs. 18 and 19 being corresponding rear and side elevations; Figs. 20, 21, and 22 show plan, rear and side elevations of one of the upper wings, while Figs. 23 and 24 show rear and side elevations respectively of a corresponding lower wing, the plan view of which is the same as that shown in Fig. 4.

I wish it to be understood that the drawings are to a certain extent of a diagrammatic nature, the control gear and certain of the usual ties, for example, being omitted in the general views in order to avoid undue complexity.

In carrying the invention into effect according to one form (see Figs. 1 and 2) the upper wing surface is swept out by the straight line $X_1 Y_1$, which always passes through the rearwardly situated point $X_1$ and travels along the guide curve, E C, so that it takes up the various positions, $X Y_2$, $X Y_3$, $X Y_4$, and so on until it reaches the position $X Y_{12}$. It is evident that the surface so swept out is a portion of that of a cone and therefore only one guide curve is necessary for its construction. The second guide curve referred to above may either be considered as infinitely small and situated at $X_1$, or it may for facility in construction be the curve exposed by any convenient section taken through the cone surface formed by the line, $X_1 Y_1$.

It will be seen on reference to Fig. 2 that the principal guide curve, E C, is straight between the points, F and D, so that the portion of the wing surface inclosed within the figure A H D G, (Fig. 1) is a plane. For the sake of clearness in this part of the description the wing may be considered to have no thickness so that the straight line, $X_1 Y_1$, sweeps out at the same time a wing surface which is concave below and convex above. Further, by selecting that portion of the conical surface so generated indicated by the parallelogram, A B C D, the angles of incidence of the fore and aft section of such wing gradually become less and change sign as the wing is built outward. It will be evident therefore that this form of wing fulfils one of the necessary conditions of the problem. Again, when a wing of the form described is driven against the air at a small mean angle of incidence, the air owing to the larger angle of incidence of the inner and forward portions of the wing is driven slightly outward as well as downward, thus transmitting pressure across the underside of the wing on to the down-turned under surface of the negatively inclined tips and so compensating to a considerable extent for the imperfect air supply from the normal front direction due to the small or negative angle of inclination. Again, it will be seen that the whole of the under surface of the wing may be considered as forming a channel the trend or axis of which is toward the apex of the cone. There is a tendency therefore not only to force the air outward along these channels or pipes but also to compress it thereby increasing the pressure under the outer portions, and thus adding further to the lift under these portions. The feed of air from the inner or forward portions toward the outer portions and the compression of air under the outer portions enables the outer portions to be placed at a very considerable negative angle of incidence as compared with the inner portions without incurring serious loss of lifting power. Such a form of wing therefore completely solves the problem, and is the form which I prefer to use.

According to a modified form of the invention (see Figs. 3, 4 and 5), the tracing line is pivoted at the forwardly disposed point, A, and travels on the guide curve, E D, taking up the successive positions, $A X_1$, $A X_2$, $A X_3$, and so on to $A X_{14}$, thereby forming a cone-shaped surface. The second guide curve may in this case be considered as that exposed by a section through the line, F G, for example. In this form lifting power is sacrificed to a certain extent to increased steadiness. Such cylindrical or conical surfaces may be described generically as developable. Further, between the two forms of the invention above described, intermediate forms may be employed in which the generating line on the whole moves more nearly parallel to itself, such intermediate forms permitting different degrees of stability and lifting power to be obtained. Thus, referring to Figs. 6 and 7, it will be seen that the outline of the wing in plan and the guide curve, E C, are the same as in Fig. 1. The line, $X_1 Y_1$, travels as in Fig. 1 until it reaches the position, $X_1 Y_6$, but then pivots about the point, A, and the X end of the line moves forward so that the line travels on the remainder of the guide curve, F C, taking up the successive positions, $A X_2$, $A X_3$, $A X_4$, and so on to $A X_9$. The wing surface thus formed consists of two cone-shaped surfaces merging into each other, one having its apex rearwardly disposed at $X_1$, and the other having its apex oppositely disposed in a forward direction at A, but it will be seen that the nature of the guide curve and of the travel of the line is carefully adjusted so that no inflection of the wing surface takes place at the junction of the two cone-shaped surfaces. The nature of the surface produced is very similar to that seen in Fig. 2, with the main difference, however, that the front edge is now straight. The curve exposed by any convenient section through the surface may for facility in construction be utilized as the second guide curve. I consider that this type of wing gives much greater steadiness in flight than that shown in Figs. 1 and 2, but that its efficiency is less.

Figure 9:
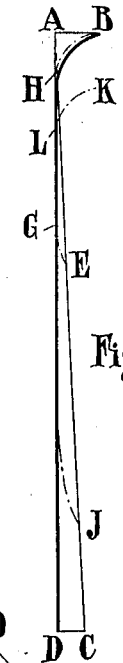
Figure 10:
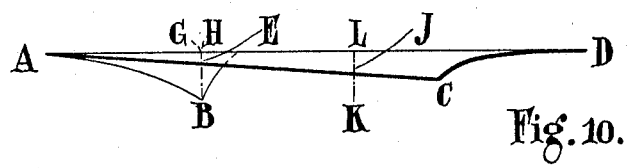

Again, Figs. 8, 9 and 10, show another modification of wing surface, partly conical and partly cylindrical. The front part of the wing is formed as in Fig. 6, as although a different guide curve, E B, is used, the part of this curve, E G, used in describing the surface between A C and A D is merely that exposed by a cross section taken in a similar direction through the wing shown in Fig. 6. The guide curve, however, is then straight as far as the point, H, whence it curves downward to B and over this portion of the curve the line travels parallel to itself forming a portion of the surface of a cylinder. Two guide curves are evidently necessary for the tracing out of this part of the wing surface, and the second guide curve is indicated by J K, the portion, L K, being a facsimile of the curve, H B. In plan the wing is the same shape as already described with reference to Figs. 1 and 6. This form of wing as will be explained hereinafter is well adapted for biplane construction. Finally, in the wing shown in Figs. 11 and 12, the apex or apices of the cone or cones of which this wing forms part of the surface or surfaces is or are removed to an infinite distance either in the direction, $X_1$, or in the direction, $Y_1$, so that the wing really forms part of the surface of a cylinder. The guide curves are indicated by F B and C E. A convenience which results from a wing of this form is that if the guide curves, F B and C E, be made arcs of circles of equal radius the curves exposed by any number of parallel planes intersecting the wing through both front and back edges are equal and similar. This enables the builder to use one or two fixed patterns of rib throughout, instead of having to construct every rib in the wing to a different curve as in the foregoing examples and consequently the cost of construction is less. This form of wing gives good stability but requires driving at a high speed to obtain adequate lift.

It will be understood that the wings in plan may take other forms than the parallelograms and triangle shown above by way of example.

In the above description of different wing forms I have considered the supporting surfaces to be of negligible thickness, but it will be evident that in actual practice a certain thickness of the wings is necessary. The most important consideration however, is the smoothness and form of the upper surface, as it is on the perfection of this part that the steadiness of the machine in flight largely depends.

In constructing the wings in practice, the lower surface is preferably swept out in a similar manner to the upper surface. The positions of the cone apices, however, are different, as otherwise the edges of the under surface would not approximate to those of the upper surface. In a double surface wing, therefore, I prefer to trace the upper surface as above described, and to describe the lower surface in a similar fashion, the path of the traveling line forming the lower surface being so chosen that the front and rear edges come as close as possible to those of the upper surface. One or both the surfaces is or are then eased off, until the edges are made to correspond, the alterations being so made that smoothness and regularity are preserved as much as possible. It may, however, be advisable in some cases to subordinate the regular coning of the under surface to considerations of the best position for the thicker parts of the wing. In constructing a machine on this principle, the upper surface would be properly swept out by the straight line, as above described, while the lower would simply lie along the bottom of properly shaped ribs. In other cases, I may form the two surfaces by building up on an imaginary surface traced by a straight line as above described, both surfaces approaching closely to the imaginary directing surface so formed. It will be seen, however, that if the under surface of the wing is swept out by a straight line in the manner indicated above, and the wing is of only moderate thickness the upper surface would depart to only an immaterial extent from the true geometrical form. All such small departures from the strict geometric form, I intend to include within the scope of the present invention.

I will now describe one form of monoplane by way of example fitted with the type of wing described above with reference to Figs. 1 and 2. Referring for this purpose to Figs. 13 to 16, the body, 1, is shaped like a bird, fish or boat and carries a motor, pilot, stores and part of the mechanism driving the propellers, 2. This body is preferably rectangular in cross sections taken through those portions which lie behind the wings, 3, the lower front part or "breast" being concave and shaped on each side as an extension of the underside of the cone-shaped wing surface (see Fig. 14). The tips of the wings should extend behind the center of gravity of the whole apparatus, this point being distant from the front end at about two-fifths of the length of the body, while the rear end of the body should preferably be lower than the rear tips of the wings. The body, 1, should be strongly constructed in the forward and middle part where the load is carried and lightly constructed in the rear part. The sides of the body are raised above the stronger portion of its framework by light bulwarks, 4, and the upper part is covered in preferably by light fabric stretched across level with the tops of the bulwarks, 4, a space, 5, being left for the pilot. A single strong skid or runner, 6, lies in a fore-and-aft direction under the center of the body, 1, and is attached thereto by a single rigid member, 7, and by symmetrically disposed pairs of rigid members, 8, sloping upward and outward from the skid, 6, to the strongly built sides of the body, 1. A pair of wheels, 9, set side by side and directly under the strong sides of the body are attached to the skid, 6, or to the apices of horizontal triangular frames projecting therefrom and are further connected to the strong sides of the body by forked vertical members, 10. The wings, 3, are attached to the body, 1, by strong boom members, 11, which members are preferably of I section or of girder-like construction, and are curved to fit under the cone-shaped wing surface but may be inclosed in the thickness of the wings. Cross ribs, 12, curved to fit the wing surface serve to strengthen the wings, 3, and to preserve their shape. Vertical struts, 13, are attached to the boom members, 11, projecting above and below and connected at their upper and lower ends by fore-and-aft members, 14, the whole being cross-braced above and below by wires, 15. A frame is erected upon the strong sides of the front part of the body, 1, consisting of an upright strut, 16, a double strut shaped like an inverted V, 17, and a fore-and-aft solid member, 18, the whole frame being braced with wires, 19. Wires, 20, are connected from the outer ends of the boom members, 11, to the tops of the struts, 13, and thence to the tops of the struts, 16 and 17, and wires, 21, pass also from the outer ends of the boom members, 11, to the lower ends of the strut, 13, and thence to the skid, 6. Other wires, 22 and 22ª, pass from the intersections of the struts, 13, with the boom members, 11, to the tops of the struts, 16 and 17, and to the skid, 6.

For the guidance of all machines constructed in accordance with this specification, I consider that the controls described in the British patent specification, No. 1469 of May 21st, 1870, which comprise horizontally pivoted flaps at the rear tips of the wings, are particularly suitable. In the present invention, similar flaps or ailerons, 23, are hinged by their front edges to the outer parts of the rear booms, 11. If with such flaps it is desired to incline the front of the machine upward the flaps would be inclined upward so as to receive air pressure upon their upper surfaces and so force the rear of the machine down. To incline the front of the machine downward the flaps would be lowered so as to receive air pressures on their under sides and so lift the rear of the machine. In order to turn to the right, the right hand flap would be raised and the left hand flap lowered; and in order to turn to the left, the left hand flap would be raised and the right hand flap lowered.

It will be observed that that portion of the rear boom, 11, which is opposite the flap, 23, is part straight and part with a slight curve. In order to simplify the hinging of the flap, 23, to the boom, 11, I slightly modify the surface at the extreme rear tip of the wing, without materially reducing its concavity, so that that part of the rear boom, 11, which is opposite to the flap, 23, may be made straight throughout, as this can be effected without departing from the general characteristics of the wing. This modification I may effect where necessary in all wings constructed in accordance with the present invention.

Short vertical struts, 24, intersect and are attached to the solid front edges of the flaps, 23, and their upper and lower ends are attached to the rear corners of the flaps, 23, by wires, 25. Stranded wire cords, 26, are attached to the ends of the struts, 24, and are led around a guide, 26ª, and thence by any convenient arrangement of pulleys or Bowden sheaths to the pilot. By pulling and slacking on these cords the flaps, 23, can be raised or lowered.

The motor, 27, is preferably placed in front of the pilot and the propellers behind, the latter in this position having less effect on the stability of the machine. A shaft, 28, passing under the pilot's seat low down in the body, 1, transmits the power from the motor to the propellers, 2, which are attached to the laterally projecting frame, 29, (see Fig. 16) and are driven from the shaft, 28, by chains, belts or by any convenient mechanism.

The shaft, 28, is preferably set below the level of the crank case of the motor and driven therefrom by any convenient gearing; by extending the shaft forward under the motor, the position of the latter can be readily changed forward or backward without any further disturbance of the driving mechanism beyond that involved in shifting the sprocket wheel or toothed wheel at the forward end of the shaft, 28, forward or backward to correspond.

Any of the above forms of wing are applicable to machines in which two sets of wings are superposed as well as to the monoplane type of machine above described. Of the forms described above, however, I consider that shown in Figs. 8, 9 and 10, the most suitable for this purpose, since on account of the whole of the front edge being straight and nearly all the back part being flat, straight boom members can be utilized in the construction of the wings and thus two such wings can be readily held in position one above the other by a truss system of upright struts and diagonal ties as in ordinary biplane construction. While the angle of incidence of the upper wings however, should decrease toward the tips and preferably become negative as before, the lower wings may have a uniform angle of incidence or even one increasing slightly toward the tips; if such increase exceeds a comparatively moderate extent, however the stability of the aeroplane will suffer. But I consider it preferable and the best results are obtained when both pairs of wings are so constructed that while their inner portions have a positive angle of incidence, their tips have a much smaller or actually negative angle of incidence, the variation being greater in the upper than in the lower pair of wings, and the superposed wings being so set relatively to each other that the tips of the upper pair are inclined forward and downward in relation to those of the lower pair.

The principles explained above in relation to a biplane may also be applied to aeroplanes having more than two superposed main supporting surfaces; in such cases it is advisable that the angle of incidence of the uppermost main supporting surface should decrease toward the tips and that these tips should slope downward and forward in relation to the tips of the lowermost surface.

According to the particular form of biplane shown, (see Figs. 17, 18 and 19) the main supporting surfaces of the machine consist of upper and lower wings, 30, and 31, respectively, (to be referred to in detail hereinafter), inclined backward as shown and connected by the vertical struts, 32, and ties, 33, usual in biplane construction. The wings themselves may be formed with longitudinal booms, 34, and transverse ribs, 35, ailerons or flaps, 36, actuated by any suitable means being hinged preferably to the booms of the upper wings. Below the lower wings is arranged a boat-shaped body, 37, rectangular in cross section and provided with a raised bulwark, 38, this body carrying a transversely disposed framework, 39, on which the propellers, 40, are mounted; as shown in Fig. 3 the rear tips of the lower wings are drooped as shown so as to be slightly below the rear end of the body.

In the particular example of my invention illustrated, the propellers are driven by chains, 41, from the motor, 42, while the position of the pilot whose head only appears above the bulwarks, is indicated by a cross in Fig. 19. Below the body an arrangement of wheels, 43, is provided with an intermediate runner, 44, to take the weight of the machine when on the ground. Vertical screens, 45, one at each end, are provided, connecting the upper and lower wings, these screens being shaped as shown in Fig. 19 to allow the ailerons to operate.

Details of one form of the wings themselves are shown in Figs. 20 to 24, this type of wing having been already described above in relation to a monoplane. The same reference letters are again used in these figures to denote corresponding parts of the upper and lower wings, such parts of the lower wing, however, as are shown in Figs. 23 and 24 in rear and side elevation being distinguished by letters with a numerical suffix.

The lower wings are of the same type as the upper wings, the angle of incidence of the inner ends being the same in each case, but as will be seen particularly on reference to Figs. 23 and 24, the gradual decrease of the angle of incidence toward the tips extends through a smaller range.

The differentiation of the range of variation of the angle of incidence in the upper and lower wings of a biplane I wish to emphasize as one of the important features of the present invention. As a result of such variation it obviously follows in a case in which the upper and lower wings have the same positive angle of incidence at the inner ends and the angle of incidence changes sign at some point of the length of the wings that the tips of the upper wing have a downward and forward inclination in relation to those of the lower wing.

With the machine described steering in either a horizontal or vertical plane may be effected by the ailerons or flaps, 36, arranged as described behind the tips of the upper wings. For instance if it is desired to make the front of the machine rise, both flaps would be inclined upward so as to reduce algebraically the angle of incidence of the fore-and-aft cross section taken through the wing surface and rear flap, while in order to make the machine descend, the rear flaps would be inclined downward: in order to turn to the right hand side, the right flap would be raised and the left flap lowered and vice versa to turn to the left.

According to a modification of the invention, instead of effecting the necessary set of the wings as described above, the rear edges of one or more of the wings may be given a certain degree of flexibility.

I find that with wings as described above in order to obtain a high degree of automatic stability it is important to preserve a proper relation between the overall length and breadth of the wings as seen in plan or in other words, between the length and breadth of a rectangle inclosing the wings.

Good stability is obtained as above stated when the rearwardly projecting wings make an angle of between 40° and 70° with the line of flight but as this angle is increased the stability becomes less perfect. In such cases, therefore, I preserve the necessary ratio between length and depth as defined above by fitting a supplementary supporting surface in front of the main wings and I preferably arrange for this surface to be movably mounted so that it may act as a horizontal rudder to elevate or depress the machine. In the limit the rearward angling may decrease to zero in which case the wings are in alinement.

Finally I wish it to be understood that although I have described certain examples of my invention in considerable detail, nevertheless the principles involved may be embodied in a variety of different forms.

Having now described my invention what I claim as new and desire to secure by Letters Patent is:—

1. An aeroplane having a pair of rearwardly extending inflectionless supporting surfaces symmetrically disposed, each of said surfaces having a positively inclined portion and a negatively inclined portion, said positively inclined portion being nearer the center line of the aeroplane than said negatively inclined portion, as set forth.

2. An aeroplane having a pair of rearwardly extending inflectionless supporting surfaces symmetrically disposed, each of said surfaces having a positively inclined center portion and a negatively inclined tip portion, as set forth.

3. An aeroplane having a pair of rearwardly extending supporting surfaces symmetrically disposed, each of said wings having a positively inclined portion and a negatively inclined portion, said positively inclined portion being nearer the center line of the aeroplane than said negatively inclined portion together with an intermediate portion having a downward concavity, the axis of the concavity running from said positively to said negatively inclined portion, as set forth.

4. An aeroplane having rearwardly projecting supporting surfaces formed with a downward concavity the axis of which is inclined backward at a greater angle to the line of flight than are the rearwardly projecting supporting surfaces themselves, as set forth.

5. An aeroplane having rearwardly extending inflectionless supporting surfaces the angle of incidence of which decreases algebraically in a direction from the center to the tips, as set forth.

6. An aeroplane having rearwardly projecting supporting surfaces concave downward and swept out by generatrices which are inclined backward at a greater angle to the line of flight than are the supporting surfaces themselves, as set forth.

7. An aeroplane having rearwardly extending main supporting surfaces with leading and trailing edges and a portion with a downward concavity, the axis of said concavity being oblique to said edges, as set forth.

8. An aeroplane having a plurality of superposed supporting surfaces the angle of incidence of the uppermost and lowermost of which decreases from the center toward the tips and are so set relatively to each other that the tips of said uppermost pair are inclined forward and downward in relation to those of said lowermost pair, as set forth.

9. A biplane having upper and lower supporting surfaces the angle of incidence of each of which decreases from the center toward the tips, the range of decrease in said angle being greater in the upper wings than in the lower, as set forth.

10. An aeroplane having a pair of supporting surfaces, the under side of each of said supporting surfaces being formed as a straight outwardly running conduit, said surfaces having a positive angle of incidence at a point toward the center line of the aeroplane and a negative angle of incidence at a point remote therefrom, as set forth.

11. An aeroplane having a pair of supporting surfaces, each of which is formed as a straight outwardly running conduit, the angles of incidence of each of said surfaces decreasing algebraically from the center to the tips, as set forth.

12. An aeroplane having supporting surfaces with leading and trailing edges, said supporting surfaces having a portion formed as a straight conduit and passing obliquely from one of said edges to the other, as set forth.

13. An aeroplane having inflectionless supporting surfaces symmetrically disposed each with a rearwardly extending leading edge and an angle of incidence decreasing from the center outwardly, as set forth.

14. An aeroplane having developable supporting surfaces symmetrically disposed, the angle of incidence of which surfaces decreases algebraically in a direction from the center to the tips, as set forth.

15. An aeroplane having developable supporting surfaces symmetrically disposed each of said surfaces having a positively inclined center portion and a negatively inclined tip portion, as set forth.

In testimony whereof I affix my signature in presence of two witnesses.

JOHN WILLIAM DUNNE.

Witnesses:
M. C. DUNNE,
A. F. BRADLEY.